United States Patent [19]

Thornsberry, Jr. et al.

[11] Patent Number: 5,261,957
[45] Date of Patent: Nov. 16, 1993

[54] PHOSPHOGYPSUM COMPOSITION HAVING IMPROVED EXPANSION PROPERTIES

[75] Inventors: Willis L. Thornsberry, Jr., Gretna, La.; James T. Houston, Mesquite, Tex.

[73] Assignee: Freeport-McMoRan Resource Partners, Limited Partnership, New Orleans, La.

[21] Appl. No.: 861,134

[22] Filed: Mar. 31, 1992

Related U.S. Application Data

[63] Continuation-in-part of Ser. No. 617,646, Nov. 26, 1990, abandoned.

[51] Int. Cl.$^5$ .................. C04B 7/04; C04B 11/26
[52] U.S. Cl. .................................. 106/735; 106/786
[58] Field of Search ............ 106/775, 773, 715, 706, 106/697, 691, 782, 735, 786

[56] References Cited

U.S. PATENT DOCUMENTS

| | | | |
|---|---|---|---|
| 3,854,968 | 12/1974 | Minnick et al. | 106/109 |
| 3,872,204 | 3/1975 | Yano | 264/102 |
| 3,947,284 | 3/1976 | Kitsugi et al. | 106/697 |
| 4,067,939 | 1/1978 | Lowe et al. | 264/42 |
| 4,124,405 | 11/1978 | Quiénot | 106/111 |
| 4,166,750 | 9/1979 | Koeppel | 106/775 |
| 4,190,455 | 2/1980 | Bijen et al. | 106/786 |
| 4,233,080 | 11/1980 | Koeppel | 106/641 |
| 4,299,516 | 11/1981 | Miyoshi et al. | 405/266 |
| 4,306,910 | 12/1981 | Miyoshi et al. | 106/89 |
| 4,353,749 | 10/1982 | Ray et al. | 106/97 |
| 4,448,566 | 5/1984 | King | 404/31 |
| 4,457,781 | 7/1984 | Palmer et al. | 106/109 |
| 4,615,809 | 10/1986 | King | 210/751 |
| 4,935,211 | 6/1990 | Azar | 423/171 |

FOREIGN PATENT DOCUMENTS 2340405  2/1976  France .

OTHER PUBLICATIONS

Annual Book for ASTM Standards for ASTM D 698-78, 1986.
ASTM C 150-85a, 1986.
ASTM D 1557-78, 1986.
ASTM D 1633-84, 1986.
ASTM C 490-83a, 1986.
ASTM D 558-82, 1986.
Standard Specifications for Transportation Materials and Methods of Sampling and Testing AASHTO designation T 99-86; T 134-76 (1986) and T 180-86.

*Primary Examiner*—Karl Group
*Assistant Examiner*—A. Wright
*Attorney, Agent, or Firm*—Fisher, Christen & Sabol

[57] ABSTRACT

Stabilized phosphogypsum-containing compositions with low expansion and high compressive strength characteristics are prepared by admixing phosphogypsum with a cementitious binder having a calculated zero percent tricalcium aluminate content The compositions may contain phosphogypsum and cementitious binder only or they may also include sand or other filler material. The phosphogypsum composition is wetted with water, compacted and allowed to cure. The amount of water added preferably produces a maximum density of the compacted composition.

29 Claims, 1 Drawing Sheet

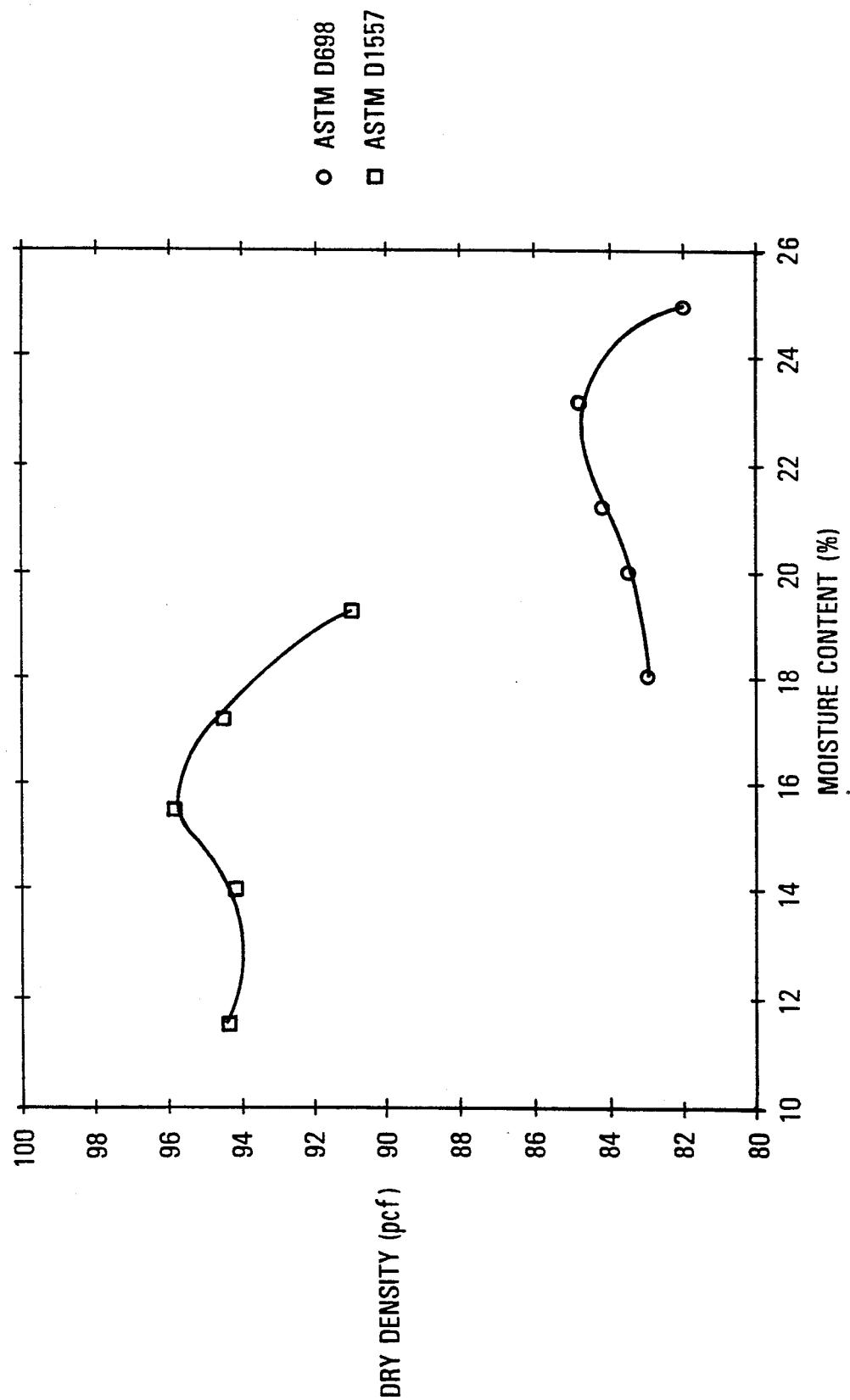

PHOSPHOGYPSUM COMPOSITION HAVING IMPROVED EXPANSION PROPERTIES

This application is a continuation-in-part of U.S. Ser. No. 07/617,646, filed Nov. 26, 1990, now abandoned.

FIELD OF THE INVENTION

This invention relates to the discovery of an improved, stabilized phosphogypsum composition and to a method for producing same. More particularly, it relates to a method for producing a phosphogypsum composition with improved volumetric stability and strength properties, and to a method of reducing the expansion of phosphogypsum compositions.

BACKGROUND OF THE INVENTION

Phosphogypsum is the by-product from the manufacture of wet-process phosphoric acid by the so-called dihydrate process. Phosphogypsum is composed primarily of (i.e. contains at least 75%) calcium sulfate dihydrate ($CaSO_4 \cdot 2H_2O$), which is commonly known as gypsum. Phosphogypsum is usually contaminated with small concentrations of impurities, such as phosphate, fluorine, and silica. This industrial by-product is generated in huge quantities and its disposal is a major problem in most areas where it is produced. Current worldwide production of phosphoric acid yields over 100 million tons of phosphogypsum per year. Because of environmental constraints, it is becoming increasingly difficult to discharge phosphogypsum into the seas or rivers, as has been done at many locations in the past. As a result of these disposal problems, most phosphogypsum currently produced in the United States is stockpiled. In Florida, a region of significant wet-process phosphoric acid production, the countryside near the wet-process phosphoric acid plants is liberally sprinkled with large mounds of the by-product phosphogypsum.

A small portion of the phosphogypsum produced is used as a substitute for natural gypsum The amount of phosphogypsum used is severely limited because of large amounts of the inexpensive natural gypsum readily available in most areas. Additionally, the phosphogypsum contains impurities which impair the qualities of the products produced from the phosphogypsum. Typically, the impurities must be removed by costly purification processes before the phosphogypsum can be used in some applications as a substitute for natural gypsum which is a material of higher purity.

Some attempts have been made to utilize phosphogypsum as base and fill materials in the construction of highways, runways, levees, etc. Some of the physical and chemical properties of phosphogypsum would appear to make it particularly useful for some of these applications. Its relatively low density should make phosphogypsum useful as a levee fill material in certain areas, e.g., Louisiana, which are known for their deep, highly water-saturated clay soils. For example, U.S. Pat. Nos. 4,299,516 and 4,306,910 disclose methods for using gypsum mixed with other ingredients for strengthening water saturated soft soils. The soil is first mixed with gypsum to make the soil reactive with the second component. The second component, which includes ordinary Portland cement and iron ore blast furnace slag, is mixed with the soil mixture and the resultant mixture is cured. The cured composition is used as a fill and base material U.S. Pat. No. 3,854,968 discloses a cementitious mixture of gypsum, lime and fly ash suitable for stabilizing soils and for use as base materials.

U.S. Pat. No. 4,353,749 describes a process wherein phosphogypsum, an alkaline waste such as the by-product of digesting bauxite with caustic soda, Portland cement and/or fly ash, and water are blended and compacted to produce a soil cement product suitable for highway pavement.

U.S. Pat. No. 4,448,566 discloses a method of making a load-bearing surface by blending phosphogypsum and fly ash and spraying the mixture with water. The blended material is then compacted to a predetermined density. The mixing, spraying with water and compacting steps are repeated several times before the material is allowed to cure to produce a sub-base and base for pavement and the like.

French Patent No. 2,340,405 describes another paving composition containing phosphogypsum having a moisture content of between 8% and 23%.

U.S. Pat. No. 4,067,939 describes a method for making cast articles from a composition comprising a mixture of calcined gypsum and Portland cement with water to produce a fluid mixture. The calcined gypsum is dehydrated by means of heat and is defined as calcium sulfate hemihydrate having a chemical formula $CaSO_4 \cdot \frac{1}{2}H_2O$. The method of this patent suffers from the distinct disadvantage of requiring that the gypsum must be calcined prior to its use, so as to convert the calcium sulfate dihydrate to a different chemical entity, namely calcium sulfate hemihydrate.

The processes described above have not ushered in an era of extensive phosphogypsum use, and the potentially valuable material continues to accumulate. A major problem with the use of the above disclosed phosphogypsum compositions in construction uses, such as for roadway bases, has been the excessive swelling or expansion of the phosphogypsum composition, resulting in heaving of the roadway. Also, the expansion often results in decompaction, the formation of cracks, and a loss of compressive strength. Calcination of phosphogypsum prior to its use in civil engineering application appears economically prohibitive.

A need obviously exists in the industry for a method of utilizing phosphogypsum in an economically and environmentally acceptable manner. A need also exists in the industry for a method of minimizing the expansion or swelling of phosphogypsum compositions which utilize cementitious binders in order that such compositions can be utilized as construction materials. It is therefore the object of this invention to provide a method of producing stabilized phosphogypsum compositions which contain cementitious binders and which exhibit acceptable volumetric stability characteristics and meet other typical construction specifications. It is a further object of this invention to provide a method of stabilizing phosphogypsum for use in the construction industry without the need for prior calcination of the phosphogypsum.

SUMMARY OF THE INVENTION

The present invention is directed to stabilized phosphogypsum compositions with improved expansion characteristics. Specifically, the invention is directed to a method of producing phosphogypsum compositions having a reduced rate of expansion. The phosphogypsum compositions are prepared by mixing phosphogypsum and cementitious binders with a theoretical (calculated) tricalcium aluminate, $3CaO.Al_2O_3$, content of zero (hereinafter such binders will also be referred to as "zero percent content $C_3A$" binders or simply as "zero-content $C_3A$" binders). The composition are prepared from mixtures of phosphogypsum, cementitious binders and water. Alternately, the compositions may also contain filler material, such as for example sand.

The cementitious binder in the preferred embodiment is zero-content $C_3A$ Portland cement. The quantity of cementitious binder used in the compositions ranges from 0.5% to 50.0% by dry weight of phosphogypsum or combined phosphogypsum- filler material depending upon the application for which the composition is to be used. In the preferred embodiment, the cementitious binder concentration is between about 1% and about 20% by dry weight of phosphogypsum or phosphogypsum-filler material. The zero-content $C_3A$ cementitious binder in this range generally produces phosphogypsum compositions having improved strength and expansion and are less subject to cracking and failure. Moisture-density tests are performed on each phosphogypsum-cementitious mixture to determine the optimum moisture content for achieving maximum density by a predetermined compaction method. The optimum amount of water is then added to the phosphogypsum-cementitious binder composition in an amount to achieve the maximum density and the composition is compacted.

BRIEF DESCRIPTION OF THE DRAWINGS

In the drawings:

FIG. 1 shows typical graphs of the density values and moisture contents used to determine optimum water content for a specific combination of materials using two different standard methods of compaction.

DETAILED DESCRIPTION OF THE INVENTION

The disadvantages of the previous phosphogypsum compositions are obviated by the present invention while providing a composition having improved volumetric stability and strength characteristics. The present invention uses cementitious binders with zero-content tricalcium aluminate ($C_3A$), $3CaO.Al_2O_3$, to prepare stabilized, phosphogypsum-containing compositions. The use of zero-content $C_3A$ cementitious binders significantly reduces the expansion commonly encountered with known phosphogypsum-cementitious binder compositions. Zero-content $C_3A$ cementitious binders, while not commonly used in the construction industry, are available from some cement manufacturers and can be prepared by others skilled in the art.

In the preferred embodiment of the invention, the cementitious binder is zero-content $C_3A$ Portland cement. The Portland cement may be replaced in whole or in part by other zero-content $C_3A$ binders. The other binders may include, for example, zero-content $C_3A$ pozzolanic materials such as fly ash, slag and microsilica and volcanic ash.

The inventors have discovered that the magnitude of the expansion of phosphogypsum-containing compositions is dependent on the $C_3A$ content of the binder. Long term expansion reduces the strength of the composition over time. Expansion in concretes has been correlated in the technical literature with the $C_3A$ content of the cementitious binder and with the tendency of the $C_3A$ to enter into reactions which result in the formation of ettringite hydrate $3CaO.Al_2O_3.3CaSO_4.32H_2O$. There is no basis, however, for assuming that the expansion in phosphogypsum-based compositions is triggered by the same mechanism which is believed to be responsible for expansion in concrete or in other compositions. In fact, the applicants have not yet been able to establish the mechanism by which the $C_3A$ content of the binder imparts expansion tendencies to phosphogypsum-cementitious binder compositions. Nevertheless, the applicants have found that the higher the $C_3A$ content, the greater the expansion problem.

In typical prior art construction applications, the use of cements with low $C_3A$ contents in concrete mixes has typically resulted in compositions with lower initial compressive strength. The compressive strength of such compositions can be increased by using a larger proportion of cement in the compositions. Surprisingly, however, the applicants have found that the use of zero-content $C_3A$ cements in phosphogypsum-based compositions resulted in formulations with higher initial compressive strength.

The inventors have also found that the use of zero-content $C_3A$ Portland cement as a binder results in superior long term expansion characteristics compared to the use of other conventional Portland cements when used as a binder with phosphogypsum. These improved expansion characteristics have been established by comparison testing of phosphogypsum-containing compositions utilizing zero-content $C_3A$ Portland cements and phosphogypsum-containing compositions utilizing Portland cements containing various levels of $C_3A$ as discussed hereinafter in greater detail.

Conventional Portland cements are generally categorized as Type I through Type V inclusive. The composition of each Type of Portland cement varies to accommodate different environments and to satisfy different needs of the user. All of these Portland cements typically contain $C_3A$ and therefore are not suitable for the present invention. For example, Type I cement typically has 8-14% $C_3A$ while Type V, which is usually the lowest, has about 4% $C_3A$ and is usually used in environments where there is a need to resist attack on the concrete by the sulfate contained in the soil and water.

The Portland cement according to the preferred embodiment of the invention is a Portland cement which contains substantially no tricalcium aluminate ($C_3A$) on a calculated basis. The $C_3A$ content is determined by the method as set forth in ASTM C150-85a (1986) as well known in the art. As used herein the term zero-content $C_3A$ Portland cement is intended to refer to Portland cements having a calculated or theoretical $C_3A$ content of substantially zero as determined by the above ASTM method.

The phosphogypsum according to the invention is the by-product of the dihydrate process for producing phosphoric acid from phosphate rock as well known in the art. Phosphogypsum comprises primarily gypsum and various impurities from the processing steps.

In a preferred embodiment of the invention, the composition of the present invention is prepared from mixtures of phosphogypsum, zero-content $C_3A$ cementitious binder and water. In an alternative preferred embodiment of the invention, the composition of the present invention may include a nonreactive filler component, such as for example, siliceous sand or other types of filler, in addition to phosphogypsum, zero-content $C_3A$ cementitious binder and water. When both phosphogypsum and filler are included in the composition, it has often been found that higher unconfined compressive strengths have been obtained (28 day cure) than when phosphogypsum or filler alone is used. The availability and cost of the filler as well as the intended use of the composition are factors which will determine the desirability of the use of filler in the amount of about 1% to about 80% b weight based on the total weight of the phosphogypsum and filler. In both preferred embodiments, the mixtures are shaped, compacted and cured using methods known to those skilled in the art In both preferred embodiments of the invention, the exact content of cementitious binder to be included in the composition will depend on the particular application, however, the cementitious binder content for any application will not be less than about 0.5% nor more than about 50% by dry weight of phosphogypsum or phosphogypsum-filler material. A preferred concentration range for the cementitious binder is between about 1% and about 20% by dry weight of phosphogypsum or phosphogypsum- filler material. In the preferred embodiment the zero-content cementitious binder is added in an amount whereby the compacted and cured composition experiences an expansion of less than 1000 microinches/inch in one year as determined by the test procedure discussed in Example 2.

The phosphogypsum composition in addition may contain various additives which are typically used in cement compositions. Examples of such additives include setting agents, pH modifiers, surfactants, sealers, etc. The additives may be added to the present phosphogypsum composition as desired to impart special characteristics. For example, sealing agents may be utilized to minimize the exposure of the cementitious compositions to water. Those skilled in the art will know that inclusion of these additives does not constitute a deviation from the basic teaching of this invention.

Water is added to the phosphogypsum-binder mix to provide for the hydration of the cementitious binder and to aid in the compaction of the mix. The amount of water added to the phosphogypsum composition may vary. Standard moisture-density tests are performed for each phosphogypsum-cement composition to determine the optimum quantity of water to be added for maximum density and field compaction control as well known in the art. As a general rule the maximum density for a given compaction effort corresponds substantially to the maximum strength of the composition when cured. The moisture-density tests typically used are those set forth in ASTM D558, D698 and D1557. As well known in the art, these tests serve to determine the optimum water content of the cementitious compositions. Equivalent AASHTO moisture-density tests (respectively AASHTO T99, T180 and T134) may be substituted for the above ASTM tests.

Deviation from the standard ASTM and AASHTO moisture-density tests are sometimes necessary if required by local standards. Such deviations do not affect the effectiveness of the invention.

The optimum water content of the phosphogypsum-cementitious binder composition is preferably that which achieves the maximum density and maximum strength at a given compaction effort. In one embodiment of the invention the optimum moisture content is determined by the method as described in ATSM D698. In this method the phosphogypsum-cementitious binder composition is prepared in at least four different moisture content specimens. The moisture contents of the individual test specimens vary by approximately 1.5%.

The moisture contents are selected to bracket the estimated optimum moisture content, thus providing specimens which, when compacted, will increase in mass to the maximum density and then decrease in density. Test specimens are prepared by placing the phosphogypsum-cementitious binder compositions in a 4.0 inch diameter mold in three layers of equal height. Each layer is compacted by twenty-five blows from a rammer having a weight of 5.5 lbs and a 2 inch diameter circular contact face. The rammer is allowed to free fall a distance of 12 inches to the surface of the sample. The wet density of the sample is recorded in pounds per cubic foot.

The samples are then dried and the moisture content and the dry density of each compacted sample is determined as follows:

$$w = [(A-B)/(B-C)] \times 100$$

and $$\gamma_d = [\gamma_m/(w+100)] \times 100$$

where
- $w$ = moisture content in percent of the compacted specimens.
- $A$ = mass of container and moist specimen.
- $B$ = mass of container and oven-dried specimen.
- $C$ = mass of container.
- $\gamma_d$ = dry density, in pounds per cubic foot (or kilograms per cubic meter) of the compacted specimen, and
- $\gamma_m$ = wet density, in pounds per cubic foot (or kilograms per cubic meter) of the compacted specimen.

The dry density values are plotted as ordinates with corresponding moisture contents as abscissas. The peak of the curve is the optimum moisture content which results in the maximum density obtainable at a given compaction effort.

As can be seen from the exemplary graph of FIG. 1 the optimum water content for a given composition will vary depending on the compaction method used. For example, a composition compacted in accordance with the method of ASTM D1557 has a lower optimum moisture content than the same composition compacted by the method of ASTM D698. The differences in optimum moisture content are distinguished by the different compactive efforts in the different methods. Generally, the greater the compactive efforts, the higher the maximum density and the lower the optimum moisture content.

The stabilized composition of the invention is prepared by uniformly mixing by mechanical means, the phosphogypsum, cementitious binder, water and the optional filler materials to produce a homogeneous mixture. The mixture is then put into place and compacted. In the preferred embodiment of the invention the compacted and cured composition has an expansion of less than 1000 microinches/inch in one year, as determined by the test procedure discussed in Example 2. The compacting of the mixture is carried out by standard industry procedures to meet specified density requirements for the particular intended use. A cure period of typically 7 days follows the compacting of the composition. The actual cure period will depend upon the local specifications which the resultant cured composition must meet. For example, in Louisiana at this time the composition would be required to reach an unconfined compressive strength of at least 250 psi in 7 days using a compaction and curing procedure specified by the local standards.

The composition of the present invention may be used in a manner similar to other materials used in making road beds and levees as well known in the art. For example, in making a road bed a mixture of the phosphogypsum and zero-content $C_3A$ cement may be applied over a soil surface and mixed with the soil using standard road making machinery. The roadbed is then wetted and compacted by suitable rolling machinery. The amount of water added to the composition and the extent of compaction are according to standard industry practice as well known in the art. In practice water is generally applied to moisten the mixture and to obtain a moisture content such that the compacted mixture has a maximum density. The amount of water added and amount of compaction generally depend on the soil conditions and the local industry practice. Typical optimum moisture contents have been found to vary between about 13% and about 25% by weight based on the total weight of the composition, depending upon the nature and composition of the phosphogypsum or phosphogypsum-filler mix and upon the extent of compactive effort.

It should be noted that the cement content per unit volume of phosphogypsum-sand mixture would increase as increased proportions of sand are used due to the sand being denser than phosphogypsum.

The following examples demonstrate the expansion and compressive characteristics of the compositions prepared in accordance with the invention. In the examples all test methods employed are conventional ASTM and AASHTO methods as generally used in the industry and as readily understood by those skilled in the art. The optimum amount of moisture added to the phosphogypsum-cement compositions of the following example was determined by ASTM-D698. Alternative methods which can be used to determine the moisture content include AASHTO T-99-86, AASHTO-T-180, AASHTO-T-134, ASTM-1557 and ASTM-D588 as recognized by those skilled in the art.

EXAMPLE I

This example demonstrates the compressive strength and expansion characteristics of the phosphogypsum - cement compositions in relation to the content of $C_3A$ under controlled conditions. Five different compositions were prepared using phosphogypsum and Portland cements containing zero percent $C_3A$, 3.3% $C_3A$, 4.0% $C_3A$, 5.6% $C_3A$ and 12.4% $C_3A$. Each composition was prepared by mechanically mixing 8.0% by weight of the Portland cement with the phosphogypsum, wherein the percent is by weight of the phosphogypsum. Water in the amount of about 19.8% to 20.0% based on the total weight of the composition was then thoroughly mixed. The amount of water added to each sample was the optimum amount to achieve maximum density as determined by ASTM D698 as well known by those skilled in the art. The $C_3A$ content of each cement used was determined by ASTM C150-85a.

The resultant composition was placed in a mold and compacted to an optimum compaction as set forth in ASTM D698. The density of the compacted compositions ranged from 86.0 lbs/ft$_3$ to 87.5 lbs/ft$_3$.

Samples of each composition were cured for 7 days and for 28 days and tested for unconfined compressive strength according to testing method ASTM D1633. The samples were cured and subjected to a four hour water soak before determining the compressive strength. The unconfined compressive strengths for each sample are set forth in Table 1 below. This data clearly demonstrates enhanced compressive strength at day 7 and day 28 for the zero content $C_3A$ cement compared to the compositions containing varying amounts of $C_3A$.

TABLE 1

COMPARISON OF COMPRESSIVE STRENGTHS FUNCTION OF $C_3A$ CONTENT IN PORTLAND CEMENT BINDERS UTILIZED IN PHOSPHOGYPSUM

| $C_3A$ Content | Unconfined Compressive Strength (psi) | |
| --- | --- | --- |
| % | 7 day | 28 day |
| 0 | 292 | 392 |
| 3.3 | 192 | 268 |
| 4.0 | 206 | 300 |
| 5.6 | 269 | 313 |
| 12.4 | 227 | 334 |

EXAMPLE II

Phosphogypsum and cement compositions containing varying $C_3A$ content were prepared as in Example I by mixing phosphogypsum with 10% Portland cement by dry weight of phosphogypsum. The amount of water added was the optimum amount as determined by ASTM D698 as in Example 1.

The samples of each composition were subjected to reactivity/expansion tests using the general procedure described in ASTM C490. The samples were compacted using 25 blows of a 12-inch drop of a 5.5 pound rammer on each of eight layers in a 11¼ inch long by 4 inch diameter mold. Each molded specimen was then fitted with embedded gage plugs. The samples were stored above a 100° F. water bath in a closed chamber to accelerate expansion reactions. The samples were removed periodically for length measurements. The expansion is recorded in Table 2.

The data of Table 2 demonstrate a significantly reduced amount of expansion for compositions containing a zero content $C_3A$ cement compared to compositions containing $C_3A$. As shown, the calculated expansion of a phosphogypsum cement composition containing 3.3% $C_3A$ is about 5 times the expansion of the composition using zero content $C_3A$. It is believed that an expansion of less than 1000 microinches/inch in one year as determined by the test method represents acceptable values for materials to be used in field construction applications. The long term expansion value achieved with the zero content $C_3A$ cement as a binder was well within this acceptable limit, but all other cements yielded compositions with unacceptably high expansion characteristics.

TABLE 2

COMPARISON OF VOLUMETRIC CHANGE AS A FUNCTION OF $C_3A$ CONTENT IN THE PORTLAND CEMENT BINDER UTILIZED IN PHOSPHOGYPSUM COMPOSITIONS

| $C_3A$ Content (%) | Long Term Reactivity/Expansion (microinches/ inch in one year) |
| --- | --- |
| 0 | 352 |
| 3.3 | 1589 |
| 4.0 | 1347 |
| 5.6 | 1806 |

TABLE 2-continued

COMPARISON OF VOLUMETRIC CHANGE AS A FUNCTION OF $C_3A$ CONTENT IN THE PORTLAND CEMENT BINDER UTILIZED IN PHOSPHOGYPSUM COMPOSITIONS

| $C_3A$ Content (%) | Long Term Reactivity/Expansion (microinches/inch in one year) |
|---|---|
| 12.4 | 4741 |

EXAMPLE III

Four compositions were prepared to compare the compressive strength of the composition in relation to the phosphogypsum and sand content. The compositions were prepared by blending phosphogypsum and sand in the amounts shown in Table 3 with 10% by dry weight Portland cement. The Portland cement had a $C_3A$ content of zero as calculated by ASTM C150-85a. The sand was a blend of 65% Mississippi River pump sand and 35% Mississippi River Bonnet Carre spillway sand. The above components were then mixed at optimum moisture content as determined by ASTM D698. The amount of water added ranged from 13.2% by weight moisture for the composition with 100% sand to 20.0 % moisture for the composition with 100% phosphogypsum.

The composition samples were then molded and compacted by the method as set forth in ASTM D698. The samples were cured in plastic bags for 28 days and submerged in water for 4 hours just prior to testing.

Each sample was subjected to compressive strength testing according to ASTM-1633-84 The results of the compressive strength tests at 28 days are shown in Table 3. As can be seen the compressive strengths of the compositions prepared from phosphogypsum-sand mixtures are higher than the compressive strengths of the compositions prepared from phosphogypsum or sand alone.

TABLE 3

COMPRESSIVE STRENGTHS OF COMPOSITIONS UTILIZING ZERO-CONTENT $C_3A$ PORTLAND CEMENT AND VARIOUS PHOSPHOGYPSUM-SAND MIXES

| Phosphogypsum Content (% by weight) | Sand Content (% by weight) | Unconfined Compressive Strength —28 days (psi) |
|---|---|---|
| 100 | — | 502 |
| 75 | 25 | 701 |
| 50 | 50 | 711 |
| — | 100 | 673 |

What is claimed is:

1. A stabilized phosphogypsum composition having reduced expansion comprising a mixture of:
   a. phosphogypsum;
   b. cementitious binder comprising Portland cement in an effective amount to bind said phosphogypsum, wherein the cementitious binder has a calculated tricalcium aluminate content of about zero and wherein said cementitious binder is included in the amount of about 0.5% to about 50%. based on the dry weight of the phosphogypsum; and
   c. water in an amount sufficient for hydration of said cementitious bin and compaction of said mixture wherein the mixture has been shaped, compacted, and cured and wherein said composition does not exhibit substantial expansion.

2. The composition of claim 1 wherein said water is included in an amount between about 13% and 25% by weight based on the total weight of the composition to obtain a maximum density of a said composition when compacted.

3. The composition of claim 1 wherein the content of the cementitious binder is between 1% and 20% by weight based on the dry weight of the phosphogypsum.

4. The composition of claim 1 wherein the amount of water for hydration and compaction is the optimum amount required to obtain maximum density of said composition and the composition is compacted to a maximum density as determined by ASTM D558.

5. The composition of claim 1 wherein the amount of water added for hydration and compaction is an optimum amount required to obtain maximum density of said composition and the mixture is compacted as determined by ASTM D698.

6. The composition of claim 1 wherein the amount of water added for hydration and compaction is an optimum amount required to obtain maximum density of said composition and the mixture is compacted as determined by ASTM D1557.

7. The composition of claim 1 wherein the amount of water added for hydration and compaction is the optimum amount required to obtain maximum density of said composition and the mixture is compacted as determined AASHTO T134.

8. The composition of claim 1 wherein the amount of water added for hydration and compaction is the optimum amount required to obtain maximum density of said composition and the mixture is compacted as determined by AASHTO T99.

9. The composition of claim 1 wherein the amount of water added for hydration and compaction is the optimum amount required to obtain maximum density of said composition and the mixture is compacted as determined by AASHTO T180.

10. The composition of claim 1 wherein the zero-content $C_3A$ cementitious binder is included in an amount whereby said composition has a long term reactivity expansion of less than 1000 microinches/inch after 1 year curing.

11. The composition of claim 1 wherein the composition further includes a nonreactive filler material.

12. The composition of claim 11 wherein the filler material is included in the amount of about 1% to 80% by weight based on the total weight of the phosphogypsum and filler material.

13. The composition of claim 11 wherein the filler material is sand.

14. The composition of claim 11 wherein said water is included in an amount between about 13% and 25% by weight based on the total weight of the composition to obtain a maximum density of said composition when compacted.

15. A method for producing a stabilized composition containing phosphogypsum comprising the steps of:
   a. admixing phosphogypsum, cementitious binder comprising Portland cement having a calculated tricalcium aluminate content of about zero, and an effective amount of water for hydration of said cementitious binder and compaction of the resultant mixture to produce a wet phosphogypsum composition, wherein the composition contains about 0.5% to 50.0% of said cementitious binder by dry weight of phosphogypsum;

b. compacting the wet phosphogypsum composition; and c. curing the compacted, wet composition.

16. The method of claim 15 wherein said water is included in an amount between about 13% and 25% by weight based on the total weight of the composition to obtain a maximum density of said compacted composition.

17. The method of claim 15 wherein the cementitious binder is admixed in the composition in the amount of 1% to 20% by dry weight of phosphogypsum.

18. The method of claim 15 wherein the water for hydration and compaction is added in an optimum amount required to obtain maximum density of said composition as determined by ASTM D558.

19. The method of claim 15 wherein water for hydration and compaction is added in an optimum amount required to obtain maximum density of said composition as determined by ASTM D698.

20. The method of claim 15 wherein water for hydration and compaction is added in an optimum amount required to obtain maximum density of said composition as determined by ASTM D1557.

21. The method of claim 15 wherein water for hydration and compaction is added in an optimum amount required to obtain maximum density of said composition as determined by AASHTO T134.

22. The method of claim 15 wherein water for hydration and compaction is added in an optimum amount required to obtain maximum density of said composition as determined by AASHTO T99.

23. The method of claim 15 wherein water for hydration and compaction is added in an optimum amount required to obtain maximum density of said composition as determined by AASHTO T180.

24. The method of claim 15 wherein the cementitious binder is included in an amount to produce a cured composition having an expansion of less than 1000 microinches/inch after 1 year curing.

25. A method for preparing a stabilized composition comprising:

a) blending phosphogypsum and nonreactive filler material to produce a mixture containing 20–99% phosphogypsum by weight based on the total weight of phosphogypsum and filler;

b) admixing cementitious binder comprising Portland cement having a calculated content of tricalcium aluminate of about zero with the phosphogypsum-filler mixture of (a) in an amount to produce a composition containing 0.5 to 50.0% cementitious binder by dry weight of phosphogypsum-filler mixture;

c) adding an effective amount of water to the composition for hydration of the cementitious binder and compaction of the resultant mixture;

d) compacting the composition; and e) curing the compacted composition.

26. The method of claim 25 wherein the filler material is sand.

27. The phosphogypsum composition of claim 1 wherein said phosphogypsum comprises primarily $CaSO_4.2H_2O$, consisting otherwise of minor impurities.

28. The method of producing the phosphogypsum composition of claim 15 wherein the phosphogypsum comprises primarily $CaSO_4.2H_2O$, consisting otherwise of minor impurities.

29. The method of claim 25 wherein said phosphogypsum comprises primarily $CaSO_4.2H_2O$, consisting otherwise of minor impurities.

* * * * *